United States Patent
Cheng et al.

(10) Patent No.: US 12,513,401 B2
(45) Date of Patent: Dec. 30, 2025

(54) CAMERA BUS CARRIER IMAGES

(71) Applicant: HEWLETT-PACKARD DEVELOPMENT COMPANY, L.P., Spring, TX (US)

(72) Inventors: Yow Wei Cheng, Taipei (TW); Kuanlin Li, Taipei (TW); Ling I. Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 759 days.

(21) Appl. No.: 17/748,192

(22) Filed: May 19, 2022

(65) Prior Publication Data
US 2023/0379585 A1    Nov. 23, 2023

(51) Int. Cl.
*H04N 23/695* (2023.01)
*G06T 1/00* (2006.01)
*H04N 23/661* (2023.01)

(52) U.S. Cl.
CPC ......... *H04N 23/695* (2023.01); *G06T 1/0035* (2013.01); *H04N 23/661* (2023.01)

(58) Field of Classification Search
CPC .......... G06T 1/0035; G05T 5/50; G06V 10/70
See application file for complete search history.

(56) References Cited

U.S. PATENT DOCUMENTS

| | | | |
|---|---|---|---|
| 10,497,094 B2 * | 12/2019 | Veldandi | G06T 3/4038 |
| 10,536,666 B1 * | 1/2020 | Robertson | G11B 27/036 |
| 11,812,154 B2 * | 11/2023 | Rao | G06V 20/46 |
| 11,997,337 B2 * | 5/2024 | Verma | H04N 21/25891 |
| 12,114,077 B2 * | 10/2024 | Wendling | H04N 21/44016 |
| 12,212,729 B2 * | 1/2025 | Chen | G06T 19/006 |
| 2020/0285056 A1 * | 9/2020 | Linde | G06F 3/012 |

* cited by examiner

*Primary Examiner* — Boubacar Abdou Tchoussou
(74) *Attorney, Agent, or Firm* — Quarles & Brady LLP

(57) ABSTRACT

The present specification describes examples of a computing device for reducing camera bus channels and bandwidth. The example computing device includes a plurality of tracking cameras to capture a plurality of tracking images. The computing device also includes a processor to receive the plurality of tracking images captured by the plurality of tracking cameras. The processor is to combine the plurality of tracking images into a carrier image. The computing device also includes a camera bus to transmit the carrier image.

20 Claims, 10 Drawing Sheets

CAMERA BUS CARRIER IMAGES

BACKGROUND

Electronic technology has advanced to become virtually ubiquitous in society and has been used to enhance many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
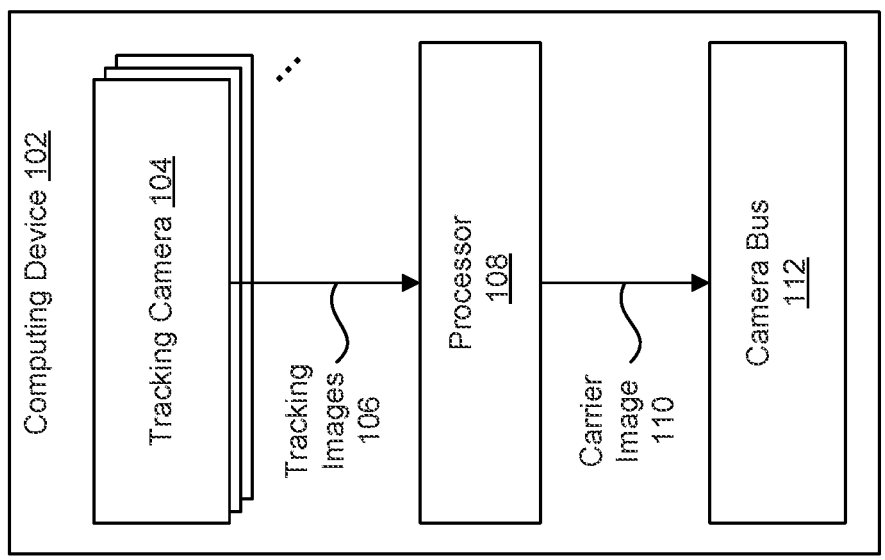
FIG. 1 is a block diagram of a computing device for reducing camera bus channels according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Electronic devices are used by millions of people daily to carry out business, personal, and social operations and it is not uncommon for an individual to interact with multiple electronic devices on a daily basis. Examples of electronic devices include desktop computers, laptop computers, all-in-one devices, tablets, head-mounted-displays (HMDs), medical devices, gaming systems, robotics, drones, and autonomous vehicles to name a few. Other examples of electronic devices include sensors that interact with users.

An electronic device may include any number of hardware components. These hardware components operate with other hardware components to execute a function of the electronic device. For example, a memory device may include instructions that are executable by a processor. The instructions when executed by the processor, may cause the processor to execute an operation on the electronic device. As a specific example, the electronic device may include a central processing unit (CPU) and/or a graphics processing unit (GPU). The electronic device also includes circuitry to interconnect the hardware components. For example, the processor of an electronic device may perform operations based on data received from hardware components. For example, sensors may provide signals to a processor, which then performs an operation based on the signals. While specific reference is made to particular hardware components, an electronic device may include any number and any variety of hardware components to carry out an intended function of the electronic device.

As electronic devices are becoming more ubiquitous in society, some developments may further enhance their integration. For example, digital images may provide useful information. In some examples, a computing device may receive digital images from a plurality of cameras. Some examples of applications where a computing device may receive digital images from a plurality of cameras include extended reality (XR) applications (e.g., virtual reality, augmented reality, mixed reality etc.) drones, robots, surveillance systems, or other applications where a computing device receives digital images from multiple cameras.

A computing device may include a camera bus to communicate digital information from the plurality of cameras to a processor. In some examples, the camera bus, the processor, or both may allow a maximum number of cameras to communicate on the camera bus at any given time. For example, some system-on-chip (SOC) devices may have insufficient hardware resources to process multiple large image files. In some approaches, the simultaneous use of the hardware may be restricted to a maximum concurrent camera use. However, the exclusive use of certain types of cameras or a certain number of cameras may degrade user experiences. Some applications may use more cameras than the maximum number of cameras allowed by the device. Furthermore, in some scenarios, such as the six degree of freedom (6DOF) tracking cameras, certain types of camera use should not be preempted. Therefore, restricting the maximum number of concurrent cameras may degrade the performance.

In an example, a virtual reality headset may contain multiple cameras, such as tracking cameras (e.g., 6DOF tracking cameras, eye-tracking cameras, mouth-tracking cameras), and display image cameras (also referred to as see-through or passthrough cameras). The total hardware buses and/or the data bandwidth consumption of those cameras may exceed the capacity the system could offer. For example, systems that feature mobility, hardware resources may be relatively minimal due the compact design of the system's dimensions, compared with laptop computers. In some examples, a mobile computing device may use a SOC that supports at most a given number of concurrent cameras.

According to the present specification, a computing device is described to break through hardware constraints to the maximum number of concurrent cameras that may communicate on a camera bus. The examples described herein reduce the camera bus and data bandwidth consumption by combining the information of image streams (e.g., video streams) from multiple cameras into carrier images.

The carrier image may be sent on a camera bus and then the information may be extracted back from those carrier images after camera bus transmission. In an example, mobile systems (e.g., compact hand-held all-in-one devices) with restricted hardware resources (e.g., an SOC) may utilize the described approaches to reduce camera bus bandwidth and consumption.

The present specification describes a computing device that includes a plurality of tracking cameras to capture a plurality of tracking images. The computing device also includes a processor to receive the plurality of tracking images captured by the plurality of tracking cameras. The processor is to combine the plurality of tracking images into a carrier image. The computing device also includes a camera bus to transmit the carrier image.

The present specification also describes a method with a processor that includes: receiving a plurality of display images captured by a first plurality of cameras; receiving a plurality of tracking images captured by a plurality of tracking cameras; determining tracking data from the plurality of tracking images; combining the plurality of display images and the tracking data into a carrier image; and transmitting the carrier image on a camera bus.

The present specification further describes a non-transitory computer readable storage medium comprising computer usable program code embodied therewith, the computer usable program code to, when executed by a processor: receive a display image captured by a first camera; receive a feature-tracking image captured by a feature-tracking camera; modify the display image by performing image steganography to combine feature-tracking data into the display image; and transmit the modified display image on a camera bus.

Turning now to the figures, FIG. 1 is a block diagram of a computing device 102 for reducing camera bus channels according to an example of the principles described herein. The computing device 102 may be any type of computing device including servers, desktop computers, laptop computers, personal digital assistants (PDAs), mobile devices, smartphones, gaming systems, and tablets, head mounted display (HMD) devices, robots, drones, among other electronic devices. The computing device 102, to complete the functionality described herein, may include a processor 108. The processor 108 may execute computer readable program code to generate the extended reality environment as described herein.

In an example, the computing device 102 may include a data storage device (not shown). The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor 108 may boot from Read Only Memory (ROM), maintain nonvolatile storage in the Hard Disk Drive (HDD) memory, and execute program code stored in Random Access Memory (RAM). The data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The computing device 102 may include a plurality of tracking cameras 104 to capture a plurality of tracking images 106. Examples of the tracking cameras 104 include 6DOF-tracking cameras, eye-tracking cameras, and/or mouth-tracking cameras. The plurality of tracking images 106 may include images capturing a view of trackable features. For example, a 6DOF-tracking camera may capture features of an object for use in tracking the following aspects of motion: rotation (e.g., left and right (yaw), backwards and forwards (pitch), and circular (roll)) and translation within space (e.g., left and right, backwards and forwards, and up and down). Eye-tracking cameras may capture images of an eye for use in obtaining eye measurements (e.g., an eye gaze value, an eye pupillometry value, an eye openness ratio, pupil positions of the eyes, etc.). Mouth-tracking cameras may capture images of a mouth that can be used to extract facial landmarks around the mouth.

In some examples, the tracking cameras 104 may be of the same type or different types. For example, one set of tracking cameras 104 may be 6DOF-tracking cameras, a second set of tracking cameras 104 may be eye-tracking cameras, and so forth. In another example, all of the tracking cameras 104 may be 6DOF-tracking cameras, or eye-tracking cameras, etc.

In some examples, the plurality of tracking images 106 may be captured by the plurality of tracking cameras 104 at a same time instant. For example, each of the tracking cameras 104 may capture a tracking image 106 at the same time, or within the same time frame.

The processor 108 may receive the plurality of tracking images 106 captured by the plurality of tracking cameras 104. For example, the plurality of tracking cameras 104 may send the separate tracking images 106 on a plurality of input camera channels. Some examples of camera channels that may be used to transmit the tracking images 106 include the Mobile Industry Processor Interface (MIPI) Camera Serial Interface (CSI) channels, universal serial bus (USB) channels (e.g., USB video class (UVC) channels). In some examples, the processor 108 may intercept the plurality of tracking images 106 captured by the plurality of tracking cameras 104. For example, the tracking cameras 104 may transmit the tracking images 106 upon capturing the tracking images 106. In some examples, the processor 108 may retrieve the tracking images 106 from the tracking cameras 104

The processor 108 may combine the plurality of tracking images 106 into a carrier image 110. As used herein, the carrier image 110 is a frame that includes information from multiple images. In some examples, the processor 108 may merge multiple tracking images 106 into the carrier image 110. For example, the processor 108 may sequentially retrieve the tracking image 106 from each tracking camera 104. In some examples, each tracking image 106 may be stored as a two-dimensional (2D) array in volatile memory of the processor 108. The processor 108 may copy the tracking images 106 into a pre-allocated buffer which is being served as the carrier image 110.

The computing device includes a camera bus 112 to transmit the carrier image 110. For example, after the tracking images 106 are copied to the carrier image 110, the carrier image 110 may be transmitted on the camera bus 112. The camera bus 112 may be a wired or wireless channel. Some examples of the camera bus 112 include an MIPI-CSI channel or a USB channel. In some examples, the camera bus 112 is to transmit the carrier image 110 to an SOC processor (not shown). The SOC processor may extract the plurality of tracking images 106 from the carrier image 110. In some examples, the SOC processor may perform a tracking operation using the tracking images 106 extracted from the carrier image 110. An example of a computing device with an SOC processor is described in FIG. 2.

As seen in these examples, the processor 108 is to merge a plurality of input camera channels into a single camera output channel with the carrier image 110 transmitted over the camera bus 112. These may be used to reduce hardware channel consumption of the cameras (e.g., tracking cameras 104) on the computing device 102. These examples may allow for more concurrent camera use on the computing device 102.

Figure 2:
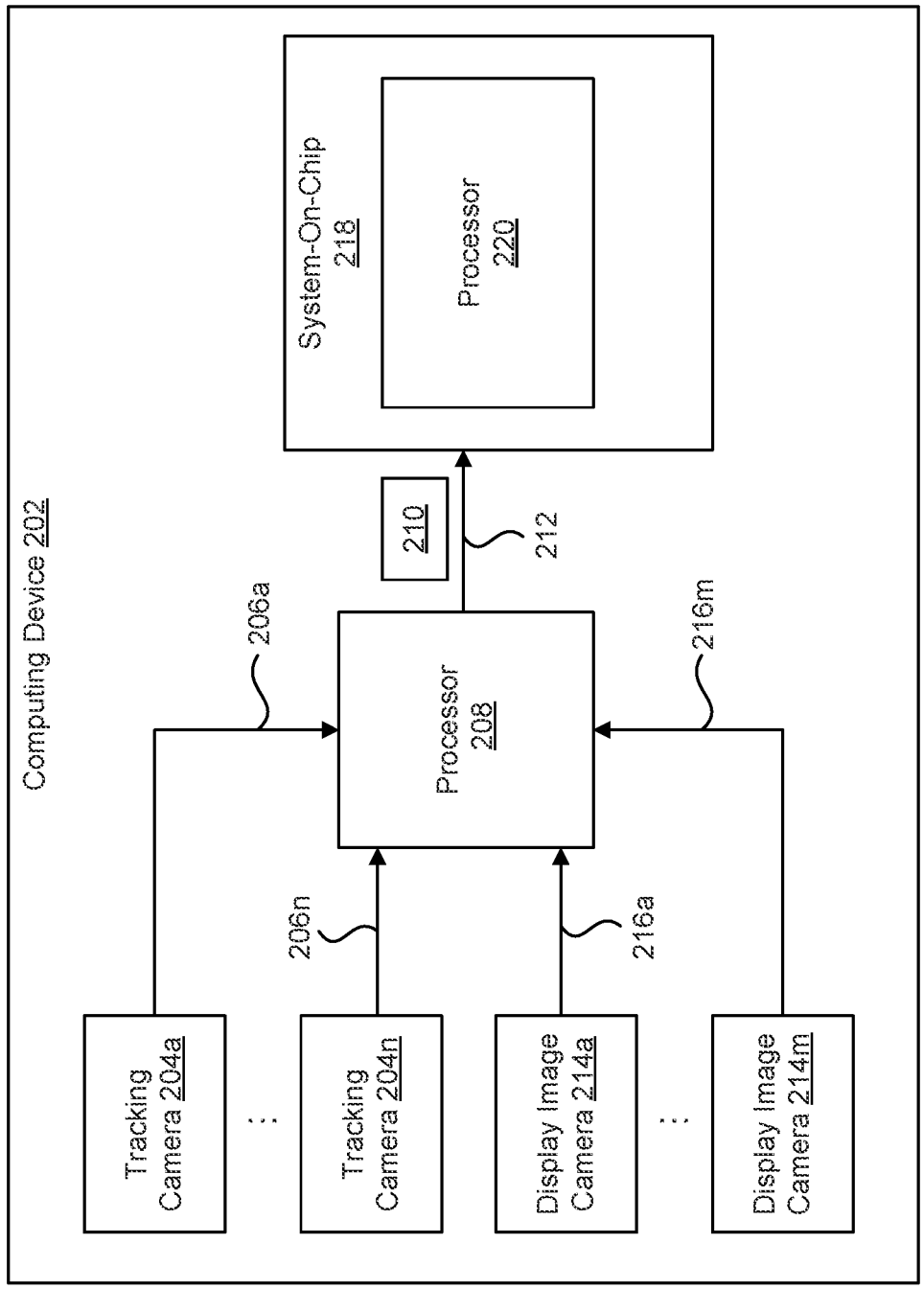
FIG. 2 is a block diagram illustrating another example of a computing device for reducing camera bus channels.

FIG. 2 is a block diagram illustrating another example of a computing device 202 for reducing camera bus channels. The computing device 202 may be implemented as described in FIG. 1. For example, the computing device 202 may include a plurality of tracking cameras 204*a*-*n* and a processor 208. The plurality of tracking cameras 204*a*-*n* may transmit a plurality of tracking images 206*a*-*n* to the processor 208.

The computing device 202 may also include a plurality of display image cameras 214*a*-*m* to capture a plurality of display images 216*a*-*m*. As used herein, a "display image" is an image that is to be presented for viewing (e.g., by a user of the computing device 202). For example, a display image may be presented on a display device (e.g., monitor, HMD, television, etc.). A display image differs from a tracking image in that the tracking image is used to track features within the tracking image and is not intended for display to a viewer. In some examples, a display image may be of higher resolution than a tracking image.

The processor 208 may combine the plurality of display images 216*a*-*m* and the plurality of tracking images 206*a*-*n* into a carrier image 210 for transmission on a camera bus 212. This may be accomplished as described in FIG. 1 with respect to tracking images. However, in this case, the processor 208 also merges both the tracking images 206*a*-*n* and the display images 216*a*-*m* into a single carrier image 210. For example, the processor 208 may store the tracking images 206*a*-*n* and the display images 216*a*-*m* as a 2D array. The tracking images 206*a*-*n* and the display images 216*a*-*m* may include raw image data that is stored in the carrier image 210.

The processor 208 may transmit the carrier image 210 over a camera bus 212 to an SOC 218. In some examples, the SOC 218 includes a processor 220. The processor 220 of the SOC 218 may extract the plurality of tracking images 206*a*-*n* and the plurality of display images 216*a*-*m* from the carrier image 210. The processor 220 of the SOC 218 may perform tracking operations using the tracking images 206*a*-*n*. The processor 220 of the SOC 218 may process the display images 216*a*-*m* for display by a display device.

Figure 3:
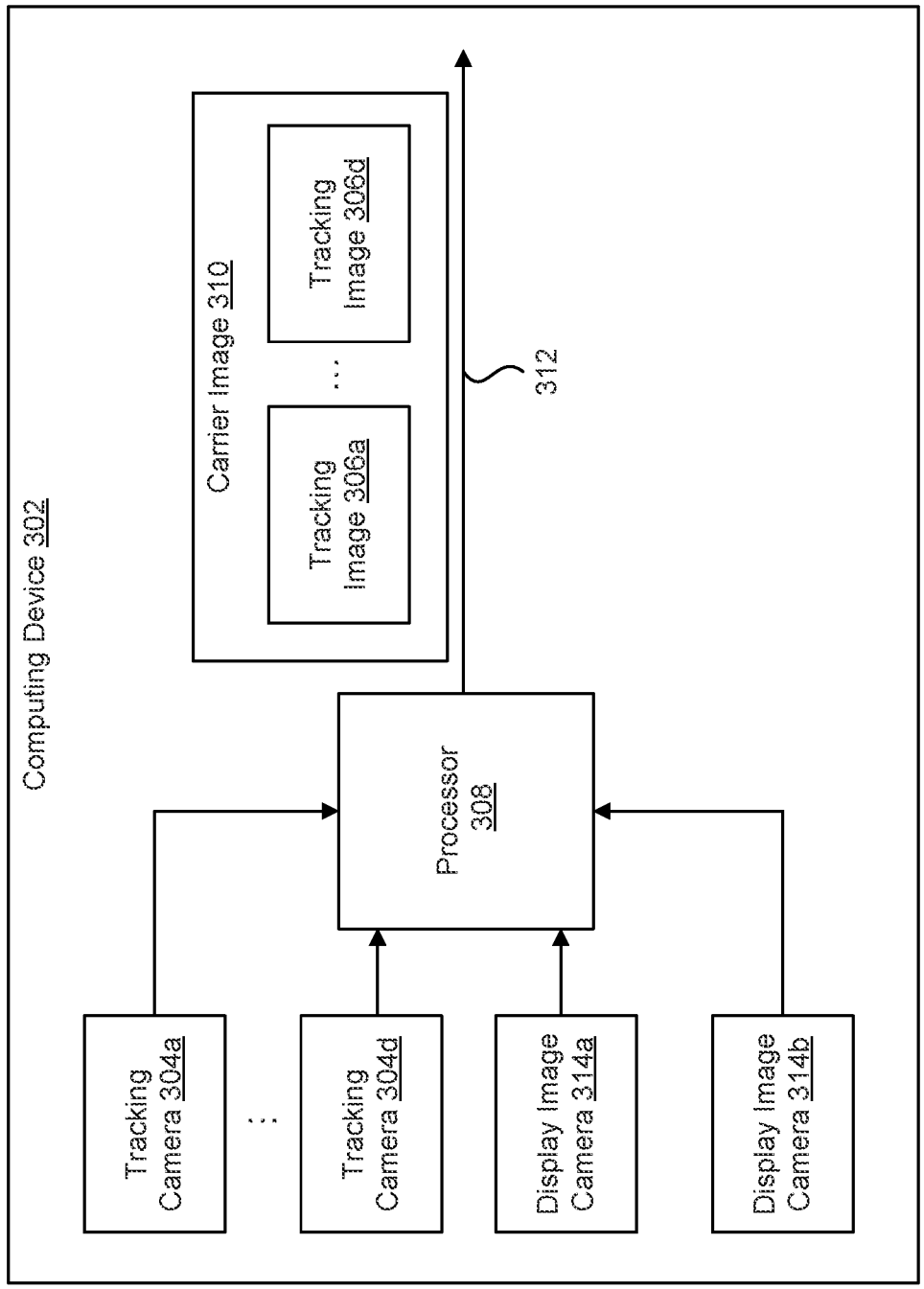
FIG. 3 is a block diagram illustrating an example of a computing device for combining a plurality of tracking images into a carrier image.

FIG. 3 is a block diagram illustrating an example of a computing device 302 for combining a plurality of tracking images 306*a*-*d* into a carrier image 310. In this example, a computing device 302 includes four active tracking cameras 304*a*-*d* and two inactive display image cameras 314*a*-*b* that are in communication with the processor 308. The tracking cameras 304*a*-*d* transmit the tracking images 306*a*-*d* to the processor 308.

Upon receiving the tracking images 306*a*-*d*, the processor 308 merges the tracking images 306*a*-*d* into a carrier image 310. The processor 308 transmits the carrier image 310 on the camera bus 312. Thus, the processor 308 merges multiple input camera channels into a single output channel. In some examples, the output channel of the processor 308 can be used as the input signal to a target SOC (not shown). In this case, the SOC may extract the source tracking images 306*a*-*d* from the carrier image 310.

Figure 4:
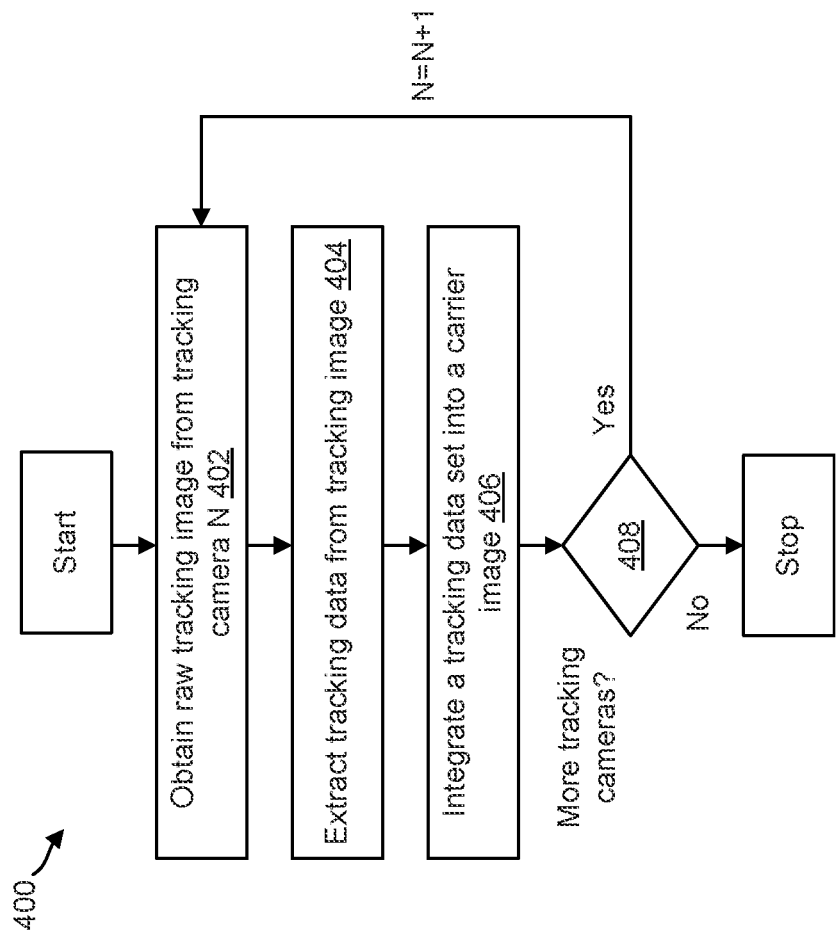
FIG. 4 is a flowchart showing a method for reducing camera bus channels according to an example of the principles described herein.

FIG. 4 is a flowchart showing a method 400 for reducing camera bus channels according to an example of the principles described herein. The method 400 may be a method engaged in by the computing device 102, 202, or 302 described in connection with FIGS. 1-3, respectively.

At 402, a processor (e.g., processor 108, 208, 308), obtains a raw tracking image from tracking camera N. For example, the computing device may include a plurality of tracking cameras. Starting at the first tracking camera (e.g., N=1), the processor may receive a tracking image captured by the first tracking camera.

At 404, the extracts tracking data from tracking images. For example, the processor may read a tracking image(s) 306*a*-*d* in data matrix M and performs tracking data extraction. Examples of processes to retrieve the tracking data include a feature matching algorithm or machine learning-based object identification to locate defined features.

At 406, the processor integrates a tracking data set into the carrier image. For example, the processor may integrate the tracking data set into the carrier image via a concatenation of the tracking data set after the display image. In some examples, the processor may integrate the tracking data set into the carrier image by inserting a tracking data array to the (elements of M)*N position of the carrier image.

At 408, the processor determines whether there are more tracking cameras. For example, the processor may determine whether it has received a tracking image from each of the tracking cameras. If the processor determines that there are more tracking cameras (408, YES), then the processor increments N (e.g., N=N+1). The processor then obtains, at 402, a raw tracking image from tracking camera N. This process may repeat until the processor determines that there are no more tracking cameras (408, NO).

Figure 5:
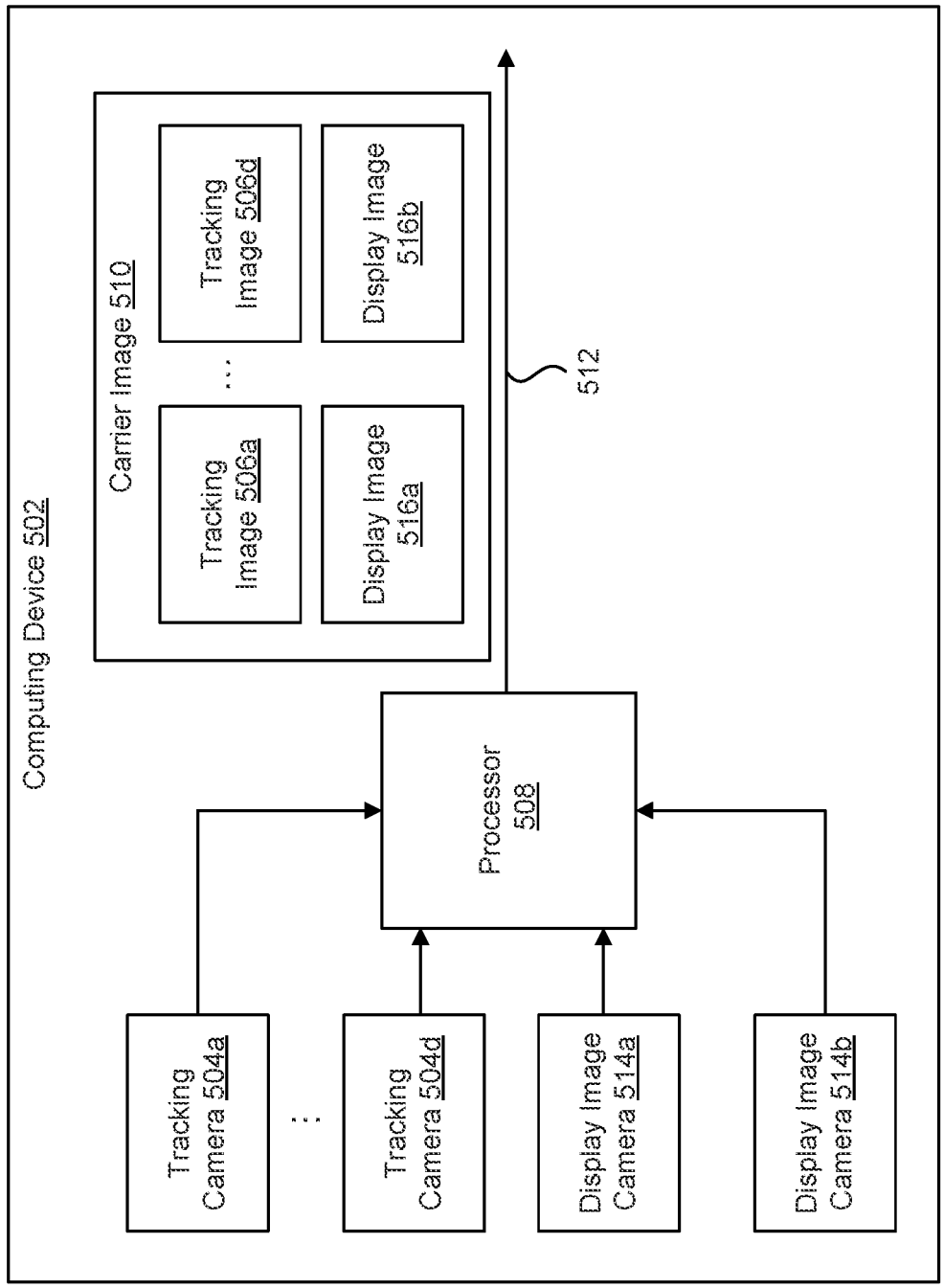
FIG. 5 is a block diagram illustrating an example of a computing device for combining a plurality of tracking images and display images into a carrier image.

FIG. 5 is a block diagram illustrating an example of a computing device 502 for combining a plurality of tracking images 506*a*-*d* and display images 516*a*-*b* into a carrier image 510. In this example, the computing device 502 includes four active tracking cameras 504*a*-*d* and two active display image cameras 514*a*-*b* that are in communication with the processor 508. The tracking cameras 504*a*-*d* transmit the tracking images 506*a*-*d* to the processor 508. For example, a first tracking camera 504*a* transmits a first tracking image 506*a*, a second tracking camera 504*b* transmits a second tracking image 506*b*, and so forth. A first display image camera 514*a* transmits a first display image 516*a* to the processor 508. A second display image camera 514b transmits a second display image 516b to the processor 508. Therefore, the processor 508 receives six channels from the four active tracking cameras 504a-d and two active display image cameras 514a-b.

In this example, the display images 516a-b are also consolidated with the tracking images 506a-d. Upon receiving the tracking images 506a-d and the display images 516a-b, the processor 508 merges the tracking images 506a-d and the display images 516a-b into a carrier image 510. Thus, the processor 508 may combine different types of images (e.g., tracking images and display images) into a carrier image 510. The processor 508 transmits the carrier image 510 on the camera bus 512. As with the example of FIG. 3, the output channel of the processor 508 can be used as the input signal to a target SOC (not shown). In this case, the SOC may extract the source tracking images 506a-d and the display images 516a-b from the carrier image 510.

Figure 6:
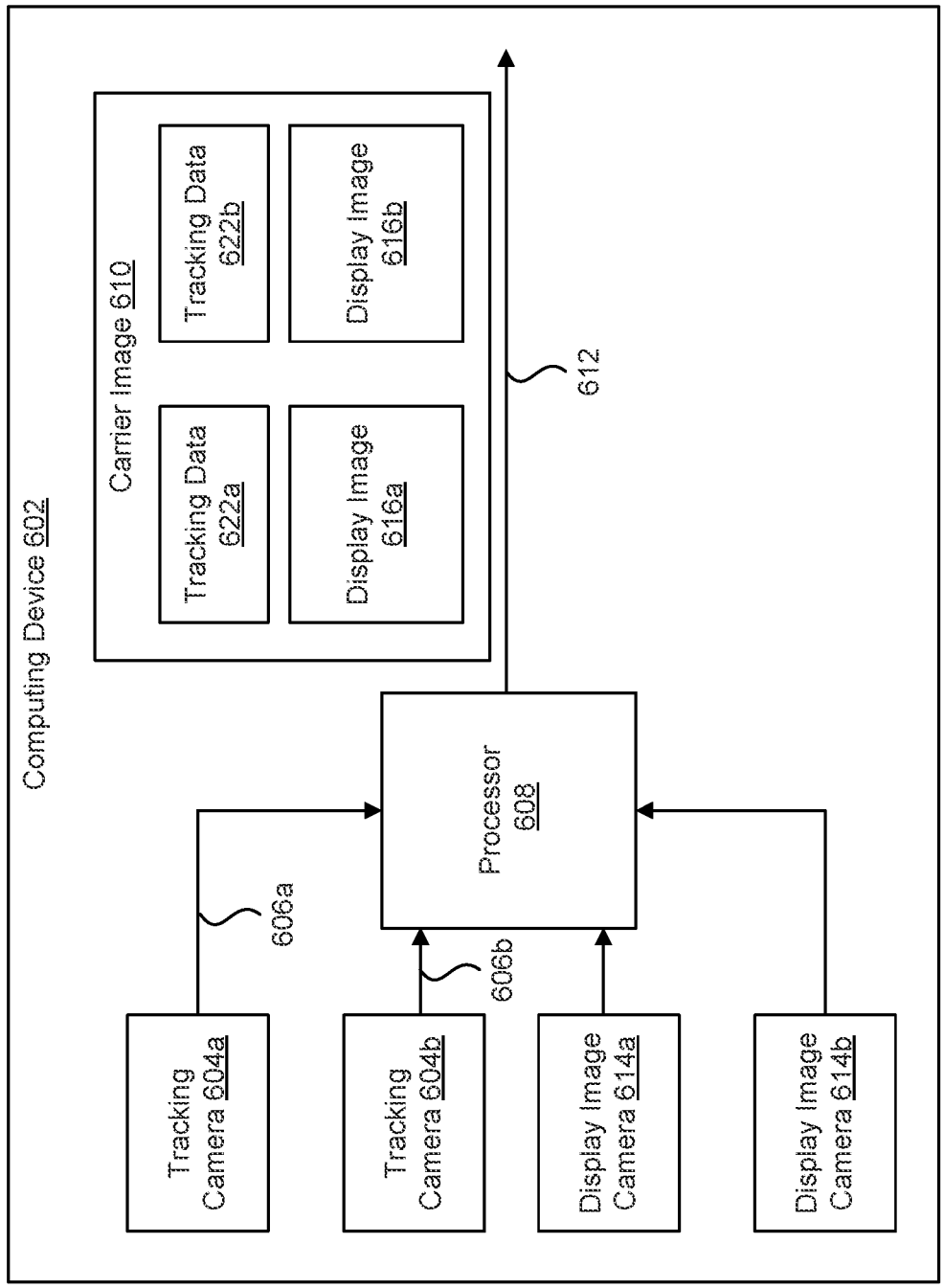
FIG. 6 is a block diagram illustrating an example of a computing device for combining tracking data and display images into a carrier image.

FIG. 6 is a block diagram illustrating an example of a computing device 602 for combining tracking data 622a-b and display images 616a-b into a carrier image 610. The examples described above may be used when a system does not have sufficient hardware channels to transmit image data from concurrent cameras. However, if the aggregated bandwidth consumption of the cameras exceed the maximum hardware bandwidth of a camera bus 612, then the above examples for combining multiple images into a single carrier image may not be applicable. FIG. 6 provides an example for reducing bandwidth on the camera bus 612. Instead of sending raw tracking images to the camera bus 612, the processor 608 may send processed tracking data that the processor 608 obtains from the raw tracking image.

In this example, the computing device 602 includes two active tracking cameras 604a-b and two active display image cameras 614a-b that are in communication with the processor 608. The tracking cameras 604a-b transmit the tracking images 606a-b to the processor 608. For example, the first tracking camera 604a transmits a first tracking image 606a, and the second tracking camera 604b transmits a second tracking image 606b. A first display image camera 614a transmits a first display image 616a to the processor 608. A second display image camera 614b transmits a second display image 616b to the processor 608.

In this example, the processor 608 obtains tracking data from the tracking images 606a-b. For example, the processor 608 may obtain a first set of tracking data 622a from the first tracking image 606a. The processor 608 may obtain a second set of tracking data 622b from the second tracking image 606b. In some examples, the processor 608 may execute a process to retrieve tracking data from a tracking image. Examples of processes to retrieve the tracking data include feature matching or machine learning-based object identification to locate defined features.

In an example of eye tracking, the tracking data retrieved from eye-tracking images may include eye-feature measurements. Examples of eye-feature measurements include left and right individual eye gaze in three-dimensional (3D) space coordinate (e.g., x, y, z) and both-eye combined eye gaze also in (x, y, z). The eye tracking data may also include left and right separate pupillometry (e.g., in mm), and left and right eye openness ratio (from 0.0-1.0). The aggregated data size of eye tracking data may be approximately 100 bytes, compared with a VGA resolution monochrome infrared (IR) image, which includes 640×460=307200 bytes of data. As seen by this example, tracking data may be considerably smaller than the raw tracking image.

Other examples of tracking data include 6DOF measurements obtained from 6DOF-tracking images. In the case of mouth tracking, mouth-feature measurements may be obtained from mouth-tracking images. The mouth-feature measurements may characterize facial landmarks observed in the mouth-tracking images.

The processor 608 merges the tracking data 622a-b and the display images 616a-b into a carrier image 610. Thus, the processor 608 may combine different types of data (e.g., images and tracking data) into a carrier image 610. The processor 608 transmits the carrier image 610 on the camera bus 612. Because the size of the tracking data is smaller than the size of the raw tracking images, the described examples reduce camera bus bandwidth consumption on the computing device 602.

As with the examples of FIG. 3 and FIG. 5, the output channel of the processor 608 can be used as the input signal to a target SOC (not shown). In this case, the SOC may extract the display images 616a-b and the tracking data 622a-b from the carrier image 610.

Figure 7:
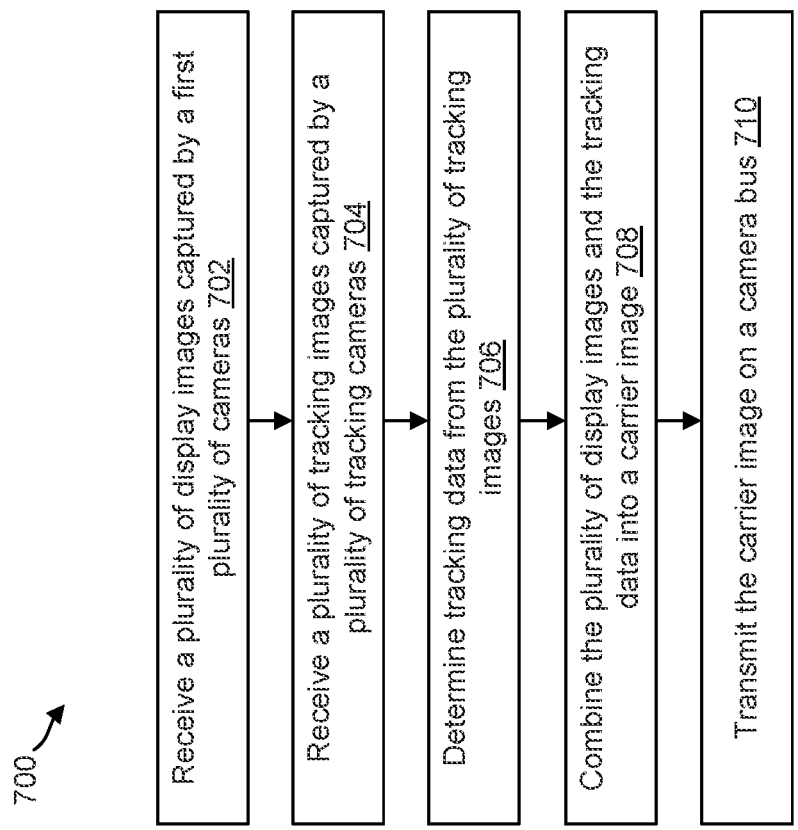
FIG. 7 is a flowchart showing a method for reducing camera bus bandwidth according to an example of the principles described herein.

FIG. 7 is a flowchart showing a method 700 for reducing camera bus bandwidth according to an example of the principles described herein. The method 700 may be a method engaged in by the computing device 602 described in connection with FIG. 6.

At 702, the processor 608 receives a plurality of display images captured by a first plurality of cameras (e.g., FIG. 6, 614a-b). For example, the display images may include images that are intended for display to a viewer.

At 704, the processor 608 may receive a plurality of tracking images captured by a plurality of tracking cameras. Examples of tracking cameras include eye-tracking cameras, 6DOF-tracking cameras, and mouth-tracking cameras.

At 706, the processor 608 may determine tracking data from the plurality of tracking images. The tracking data may include feature-tracking data. For example, the processor 608 may perform feature matching or machine learning-based object identification to locate defined features within the tracking images.

At 708, the processor 608 may combine the plurality of display images and the tracking data into a carrier image. For example, the processor 608 may synchronize the plurality of display images and the plurality of tracking images to ensure that the tracking images and display images come from the same timeframe. The plurality of display images and the tracking data may be written to a single carrier image.

At 710, the processor 608 may transmit the carrier image on a camera bus. Because the size of the tracking data is less than the size of the tracking images, the camera bus bandwidth is reduced by transmitting the tracking data instead of the tracking images.

In some examples, a second processor (e.g., processor of an SOC) may receive the carrier image on the camera bus. The second processor may extract the plurality of display images and the tracking data from the carrier image. The second processor may cause the display images to be displayed by a display device. The second processor may perform a tracking operation using the tracking data.

Figure 8:
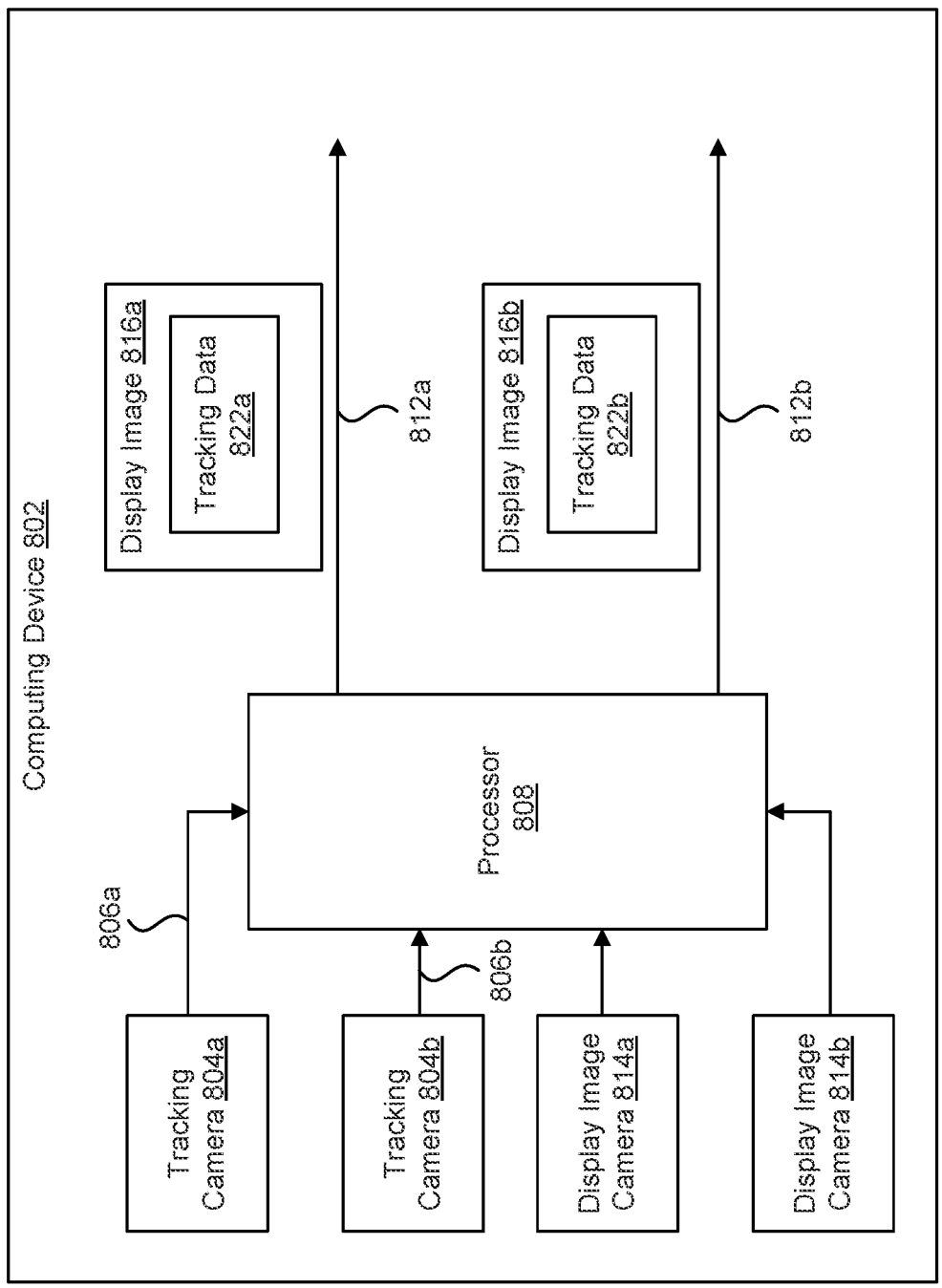
FIG. 8 is a block diagram illustrating an example of a computing device for combining tracking data and display images into a carrier image.

FIG. 8 is a block diagram illustrating an example of a computing device 802 for combining tracking data 822a-b and display images 816a-b into a carrier image 810. In some examples, a camera combination may include high-resolution display image cameras and low-resolution (e.g., monochrome) tracking cameras. The high-resolution display image camera output video steam may fully occupy the camera bus bandwidth. Thus, in some examples, both tracking cameras and display image cameras may all be streaming, as shown in FIG. 8.

In this example, the processor 808 may receive a display image 816a captured by a first camera (e.g., display image camera 814a). The processor 808 may receive a tracking image 806a captured by a tracking camera 804a. The processor 808 may receive a display image 816b captured by a second camera (e.g., a second display image camera 814b). The processor 808 may receive a second tracking image 806b captured by a second tracking camera 804b.

The processor 808 may extract tracking data 822a from the first tracking image 806a and second tracking data 822b from the second tracking image 806b. This may be accomplished as described in FIG. 6.

The processor 808 may modify a display image 816a by performing image steganography to combine tracking data 822a into the display image 816a. For example, the processor 808 may use an image steganography technique (also referred to as invisible digital watermark) to conceal extra information into a carrier image (i.e., the display image 816a) without adding more bytes into the carrier image. Therefore, the dataset (e.g., the tracking data 822a) from one camera type can be carried by the image (e.g., the display image 816a) from other cameras without adding more channel hardware and bandwidth consumption to the system. The processor 808 may perform the image steganography by adding a digital watermark that includes the tracking data merged into the display image.

In an example, by using image steganography, a 100-byte tracking data set may be concealed within the display image and transferred along with the channel and bandwidth of the display image. Thus, in this example, the extracted tracking data 822a may be merged inside the display image 816a using image steganography. In some examples, the tracking data 822a includes eye-feature measurements, 6DOF measurements, or mouth-feature measurements extracted from the tracking image 806a by the processor 808.

In another example, an entire tracking image 806a may be concealed within the display image 816a. Depending on the size of the raw tracking image 806a and the size of the display image 816a, an entire raw tracking image may be concealed into the display image. For example, a display image 816a that is a full high definition (FHD) color image with RGB 3 channels could conceal a VGA 640×480 monochrome tracking image using image steganography. Thus, in this example, the tracking image 806a is the tracking data 822a that is concealed in the display image 816a through image steganography.

The processor 808 may transmit the modified display image 816a on a first camera bus 812a. The processor 808 may transmit a second display image 816b modified with the second tracking data 822b on a second camera bus 812b. As with the examples described above, the output channel of the processor 808 can be used as the input signal to a target SOC (not shown). In this case, the SOC may extract the tracking data 822a concealed in the display image 816a.

It should be noted that in some examples, a given display image (e.g., the first display image 816a or the second display image 816b) fully occupies the bandwidth of the camera bus. In this case, as shown in the example of FIG. 8, the first display image 816a may be transmitted on a first camera bus 812a and the second display image 816b may be transmitted on the second camera bus 812b.

In some examples, a single camera bus may transmit both the first display image 816a or the second display image 816b. For example, in cases where multiple display images do not fully occupy the bandwidth of a camera bus, the multiple display images may be transmitted on a single camera bus.

In the example of FIG. 8, sensitive biological tracking data may be concealed in the display image. Concealing the tracking data may offer protection to a user's privacy.

Figure 9:
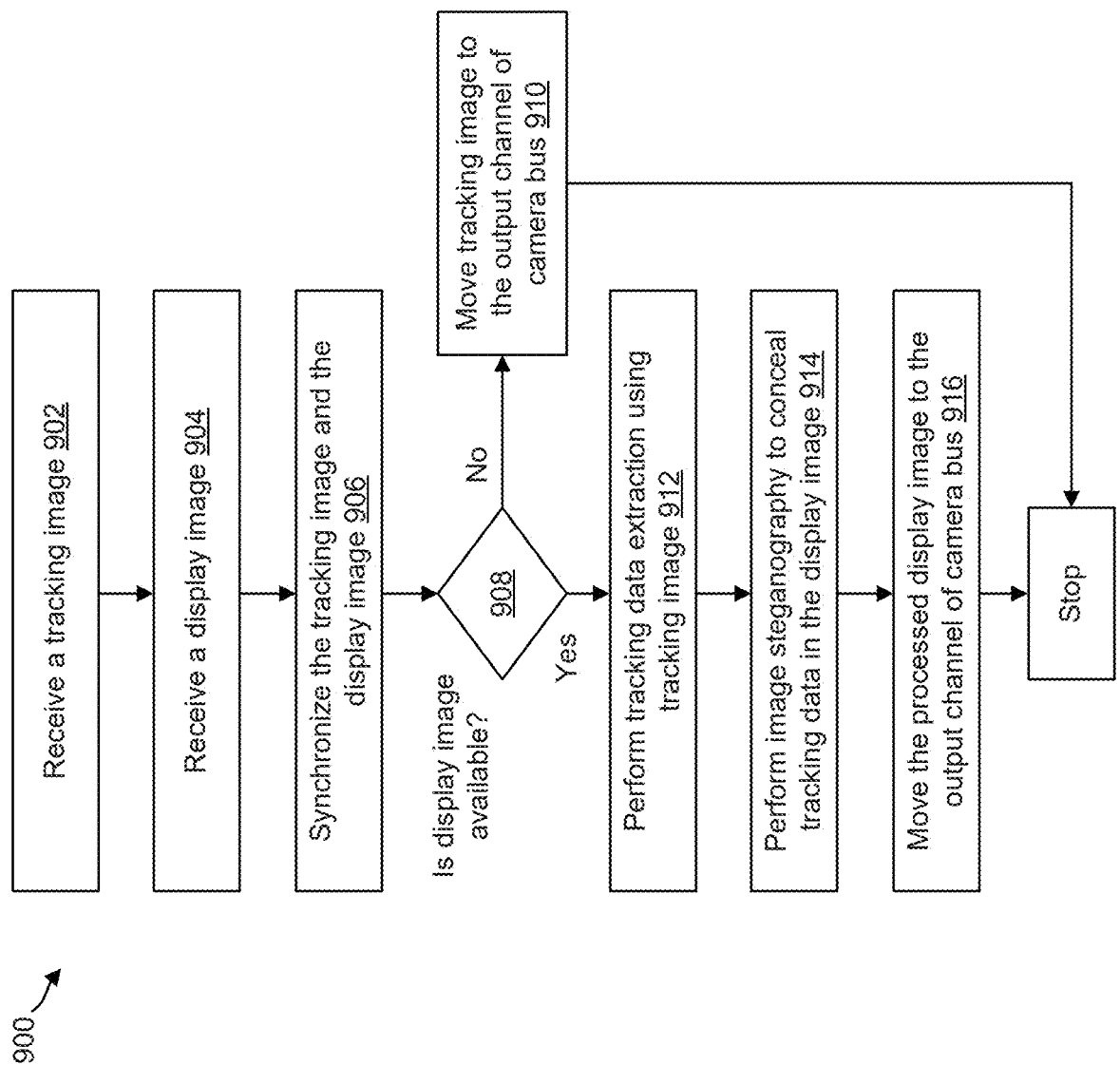
FIG. 9 is a flowchart showing a method for reducing camera bus bandwidth according to another example of the principles described herein.

FIG. 9 is a flowchart showing a method 900 for reducing camera bus bandwidth according to another example of the principles described herein. The method 900 may be a method engaged in by the computing device 802 described in connection with FIG. 8.

At 902, the processor 808 receives a tracking image. At 904, the processor 808 receives a display image. In some examples, the display image is a high-resolution image. At 906, the processor 808 synchronizes the tracking image and the display image. For instance, the processor 808 may determine that the tracking image and the display image were captured at the same time.

At 908, the processor 808 determines if a display image is available. If no display image is available (908 NO), then, at 910, the processor 808 moves the tracking image to the output channel on the camera bus. If a display image is available (908 YES), then, at 912, the processor 808 performs tracking data extraction using the tracking image. At 914, the processor 808 performs image steganography to conceal tracking data into the display image. At 916, the processor 808 moves the processed display image to the output channel on the camera bus.

Figure 10:
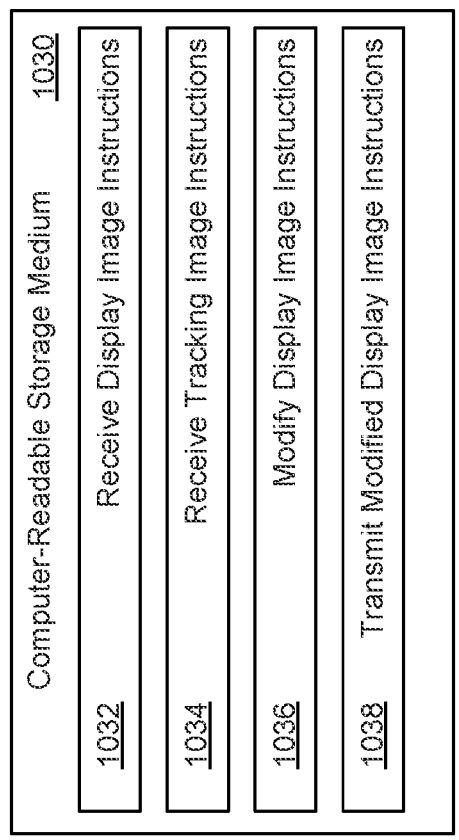
FIG. 10 depicts a non-transitory computer-readable storage medium for reducing camera bus bandwidth, according to an example of the principles described herein.

FIG. 10 depicts a non-transitory computer-readable storage medium 1030 for reducing camera bus bandwidth, according to an example of the principles described herein. To achieve its desired functionality, the computing device (FIG. 8, 802) includes various hardware components. Specifically, the computing device (FIG. 8, 802) includes a processor (FIG. 8, 808) and a computer-readable storage medium 1030. The computer-readable storage medium 1030 is communicatively coupled to the processor (FIG. 8, 808). The computer-readable storage medium 1030 includes a number of instructions 1032, 1034, 1036, 1038 for performing a designated function. In some examples, the instructions may be machine code and/or script code.

The computer-readable storage medium 1030 causes the processor to execute the designated function of the instructions 1032, 1034, 1036, 1038. The computer-readable storage medium 1030 can store data, programs, instructions, or any other computer-readable data that can be utilized to operate the device (FIG. 8, 808). Computer-readable storage medium 1030 can store computer usable program code that the processor (FIG. 8, 808) of the computing device (FIG. 8, 808) can process, or execute. The computer-readable storage medium 1030 can be an electronic, magnetic, optical, or other physical storage device that contains or stores executable instructions. Computer-readable storage medium 1030 may be, for example, Random-Access Memory (RAM), an Electrically Erasable Programmable Read-Only Memory (EEPROM), a storage device, an optical disc, etc. The computer-readable storage medium 1030 may be a non-transitory computer-readable storage medium 1030.

Referring to FIG. 10, receive display image instructions 1032, when executed by the processor (FIG. 8, 808), cause the processor (FIG. 8, 808) to receive a display image captured by a first camera (e.g., a display image camera). Receive tracking image instructions 1034, when executed by the processor (FIG. 8, 808), cause the processor (FIG. 8, 808) to receive a tracking image captured by a tracking camera (e.g., an eye-tracking camera, a 6DOF-tracking camera, a mouth-tracking camera, etc.).

Modify display image instructions 1036, when executed by the processor (FIG. 8, 808), cause the processor (FIG. 8, 808) to modify the display image by performing image steganography to combine tracking data into the display image. In some examples, the tracking data includes a tracking image concealed in the display image through the image steganography. In some examples, the tracking data includes eye-feature measurements, 6DOF measurements, or mouth-feature measurements extracted from the tracking image. Transmit modified display image instructions 1038, when executed by the processor (FIG. 8, 808), cause the processor (FIG. 8, 808) to transmit the modified display image on a camera bus.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing device, comprising:
   a plurality of tracking cameras to capture a plurality of tracking images;
   a processor to:
      receive the plurality of tracking images captured by the plurality of tracking cameras;
      extract, using a machine-learning model, a set of tracking data from each of the plurality of tracking images; and
      integrate the sets of tracking data from the plurality of tracking images into a carrier image; and
   a camera bus to transmit the carrier image.

2. The computing device of claim 1, wherein the plurality of tracking images comprise images capturing a view of trackable features.

3. The computing device of claim 1, wherein the camera bus comprises a wired or wireless channel.

4. The computing device of claim 1, wherein the plurality of tracking images are captured by the plurality of tracking cameras at a same time instant.

5. The computing device of claim 1, wherein the camera bus is to transmit the carrier image to a system-on-chip (SOC) processor, wherein the SOC processor is to extract the plurality of tracking images from the carrier image.

6. The computing device of claim 1, further comprising a plurality of cameras to capture a plurality of display images, wherein:
   the processor is to combine the plurality of display images and the sets of tracking data into the carrier image for transmission on the camera bus.

7. The computing device of claim 1, wherein the processor is to merge a plurality of input camera channels into a single camera output channel with the carrier image transmitted over the camera bus.

8. The computing device of claim 6, wherein the processor is to combine the plurality of display images and the sets of tracking data into the carrier image for transmission on the camera bus via concatenation of the sets of tracking data after the display images.

9. The computing device of claim 1, further comprising a first camera to capture a display image, wherein the processor is to use the display image as the carrier image and integrate the sets of tracking data into the display image.

10. The computing device of claim 9, wherein the processor is to integrate the sets of tracking data into the display image using image stenography.

11. A method, comprising:
    with a processor:
       receiving a plurality of display images captured by a first plurality of cameras;
       receiving a plurality of tracking images captured by a plurality of tracking cameras;
       extracting, using a machine-learning model, a set of tracking data from each of the plurality of tracking images;
       combining the plurality of display images and the sets of tracking data from the plurality of tracking images into a carrier image; and
       transmitting the carrier image on a camera bus.

12. The method of claim 11, further comprising synchronizing the plurality of display images and the plurality of tracking images.

13. The method of claim 11, wherein the tracking data comprises feature-tracking data.

14. The method of claim 11, wherein with a second processor:
    receiving the carrier image on the camera bus; and
    extracting the plurality of display images and the tracking data from the carrier image.

15. A non-transitory computer readable storage medium comprising computer usable program code embodied therewith, the computer usable program code to, when executed by a processor:
    receive a plurality of tracking images captured by a plurality of tracking cameras;
    extract, using a machine-learning model, a set of tracking data from each of the plurality of tracking images; and
    integrate the sets of tracking data from the plurality of tracking images into a carrier image; and
    transmit the carrier image on a camera bus.

16. The non-transitory computer readable storage medium of claim 15, further comprising to:
    receive a display image captured by a first camera; and
    create the carrier image by modifying the display image and performing image steganography to combine the sets of tracking data into the display image.

17. The non-transitory computer readable storage medium of claim 16, wherein performing the image steganography comprises adding a digital watermark that includes the tracking data to the display image.

18. The non-transitory computer readable storage medium of claim 16, wherein the plurality of tracking images are lower resolution than the display image.

19. The non-transitory computer readable storage medium of claim 15, wherein the sets of tracking data comprise eye-feature measurements, 6DOF measurements, or mouth-feature measurements extracted from the tracking images.

20. The non-transitory computer readable storage medium of claim 15, further comprising to:
    receive a plurality of display images captured by a plurality of display cameras; and
    combine the plurality of display images and the sets of tracking data into the carrier image for transmission on the camera bus.

* * * * *